(12) United States Patent
Cheng

(10) Patent No.: US 6,494,479 B1
(45) Date of Patent: Dec. 17, 2002

(54) FOLDING DEVICE FOR A FOLDABLE STROLLER

(76) Inventor: Kenny Cheng, No. 16, Lane 47, Chih Feng St., Taipei (TW)

( * ) Notice: Subject to any disclaimer, the term of this patent is extended or adjusted under 35 U.S.C. 154(b) by 0 days.

(21) Appl. No.: 09/602,445

(22) Filed: Jun. 23, 2000

(51) Int. Cl.$^7$ ................................................. B62B 3/02
(52) U.S. Cl. ........................ 280/647; 280/650; 280/658
(58) Field of Search ................................. 280/642, 644, 280/647, 649, 650, 655, 655.1, 657, 658, 47.38, 47.4; 403/101, 102, 321, 322.1, 322.3

(56) References Cited

U.S. PATENT DOCUMENTS

| | | | | |
|---|---|---|---|---|
| 5,244,228 A | * | 9/1993 | Chiu ........................... | 280/642 |
| 5,427,402 A | * | 6/1995 | Huang ......................... | 280/642 |
| 5,460,398 A | * | 10/1995 | Huang ......................... | 280/642 |
| 5,865,460 A | * | 2/1999 | Huang ......................... | 280/642 |
| 5,934,153 A | * | 8/1999 | Yang .......................... | 74/551.3 |
| 5,938,230 A | * | 8/1999 | Huang et al. ................. | 280/650 |
| 6,135,487 A | * | 10/2000 | Flannery et al. ............. | 280/642 |
| 6,196,571 B1 | * | 3/2001 | Chen et al. .................. | 280/647 |

* cited by examiner

Primary Examiner—Brian L. Johnson
Assistant Examiner—Bridget Avery

(74) Attorney, Agent, or Firm—Dorsey & Whitney LLP

(57) ABSTRACT

There is disclosed a folding device for a foldable stroller, comprising a switch button (10), a handle portion (12), a linkage portion (14), an engaging means (16) and a spring (18), and characterized in that the handle portion (12) has an opening (121) through which the protrusion portion (161) of the engaging means (16) passes, a hole (122) for accommodating and fixing the upper supporting member (11) of the stroller, two lugs (123, 124) for fixing the rear supporting member (15) of the stroller, and a spring receiving portion (125) for holding the spring (18); the linkage portion (14) has a hole (141) and is used for linking the upper supporting member (11) of the stroller and the lower supporting member (13) of the stroller together; the switch button (10) has a depressing portion (101) on the top and a recess (102) at the bottom for accommodating the protrusion portion (161) of the engaging means (16); the engaging means (16) has a protrusion portion (161) which is accommodated and secured in the recess (102) of the switch button (10), two fixing arms (162, 163) on which the upper supporting member (11) of the stroller is fixed, and a recess (164) for holding the spring (18); and the spring (18) is mounted between the protrusion portion (161) of the engaging means (16) and the spring receiving portion (125) of the handle portion (12), for biasing the protrusion portion (161) of the engaging means (16) forwards so that the engaging means (16) is engaged with the lower supporting member (13) of the stroller.

7 Claims, 6 Drawing Sheets

FOLDING DEVICE FOR A FOLDABLE STROLLER

BACKGROUND OF THE INVENTION

1. Field of the Invention

The present invention relates to a folding device, more particular to a folding device for a foldable stroller, which can form a very secure structure when the foldable stroller is stretched in an extended position for use.

2. Description of the Related Art

For a variety of foldable strollers, there is provided a folding device which can be spread in an engaged state to form a supporting structure when the foldable stroller is stretched in an extended position for use. On the other hand, the folding device can be released from the engaged state when the foldable device is to be collapsed. Referring to FIG. 1, for example, in U.S. Pat. No. 5,460,398, there is disclosed a folding device for a stroller, comprising a button (28), a sliding hook member (27), a positioning means (20), a spring (26) and a retainer means (30), wherein the hook of sliding hook member (27) is engaged with the opening of retainer means (30) in an engaged state to form a supporting structure for a stroller. For storage or carriage, a user may push down the button (28) to release the engaged state. However, the prior art folding device encounters a problem that the structure formed by engaging the hook of sliding hook member with the opening of retainer means is not secure enough. Also the hook of sliding hook member is apt to be broken and the lifetime of the folding device is not long. In addition, the whole structure of the folding device is too complicate for mass production and the assembly for the folding device is not easy.

SUMMARY OF THE INVENTION

In view of the above problems occurred in the prior arts, the object of the present invention is to provide a folding device for a foldable stroller, in which a very secure structure can be obtained when the foldable stroller is stretched in an extended position for use.

Another object of the present invention is to provide a folding device for a foldable stroller, in which the lifetime thereof is long.

A further object of the present invention is to provide a folding device for a foldable stroller, in which the assembly thereof is easy.

According to one aspect of the present invention, there is provided a folding device for a foldable stroller, comprising a switch button (10), a handle portion (12), a linkage portion (14), an engaging means (16) and a spring (18), and characterized in that the handle portion (12) has an opening (121) through which the protrusion portion (161) of the engaging means (16) passes, a hole (122) for accommodating and fixing the upper supporting member (11) of the stroller, two lugs (123, 124) for fixing the rear supporting member (15) of the stroller, and a spring receiving portion (125) for holding the spring (18); the linkage portion (14) has a hole (141) and is used for linking the upper supporting member (11) of the stroller and the lower supporting member (13) of the stroller together; the switch button (10) has a depressing portion (101) on the top and a recess (102) at the bottom for accommodating the protrusion portion (161) of the engaging means (16); the engaging means (16) has a protrusion portion (161) which is accommodated and secured in the recess (102) of the switch button (10), two fixing arms (162, 163) on which the upper supporting member (11) of the stroller is fixed, and a recess (164) for holding the spring (18); and the spring (18) is mounted between the protrusion portion (161) of the engaging means (16) and the spring receiving portion (125) of the handle portion (12), for biasing the protrusion portion (161) of the engaging means (16) forward so that the engaging means (16) is engaged with the lower supporting member (13) of the stroller.

Since the engaging means (16) is fixed on the upper supporting member (11) of the stroller on one hand and engaged with the lower supporting member (13) of the stroller on the other hand, a very secure structure can be obtained when the foldable stroller is stretched in an extended position for use.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
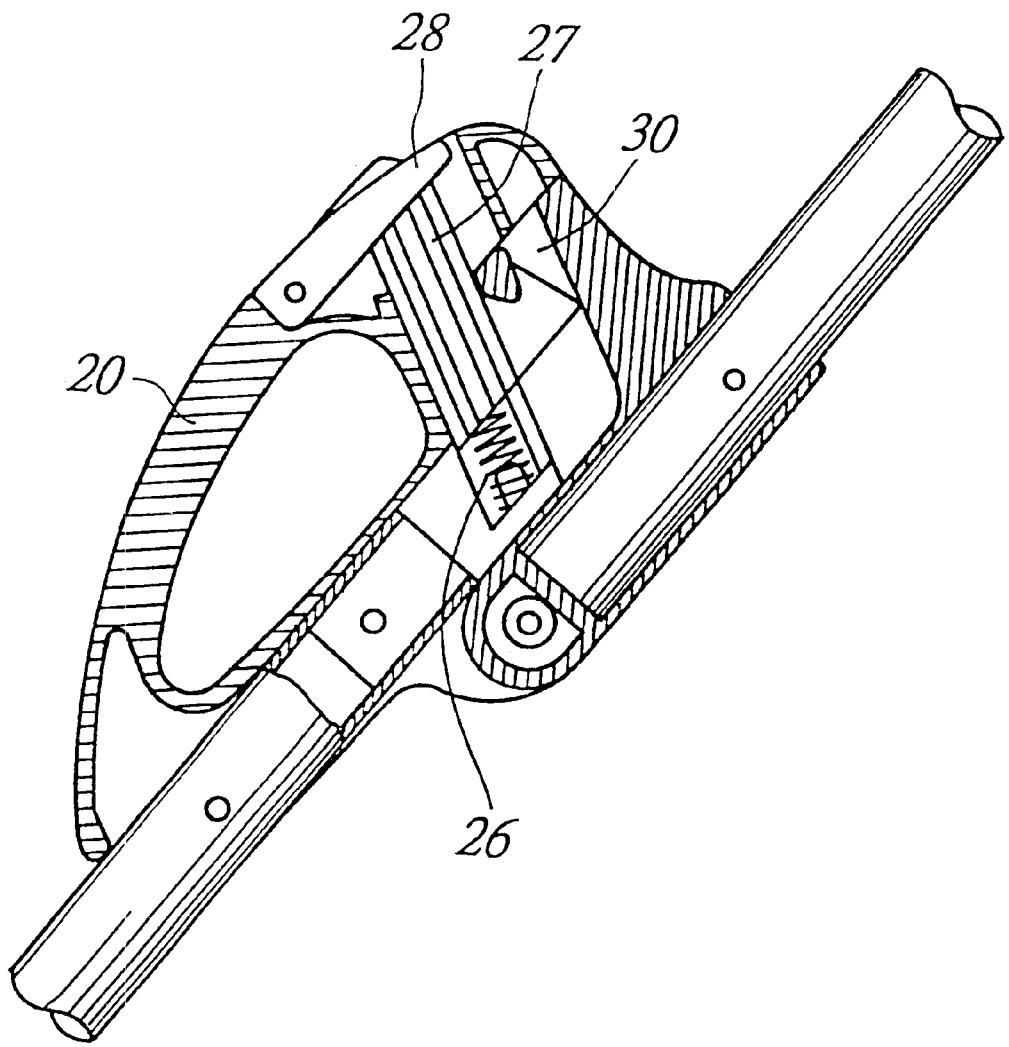
FIG. 1 shows a conventional folding device for a stroller.
Figure 2:
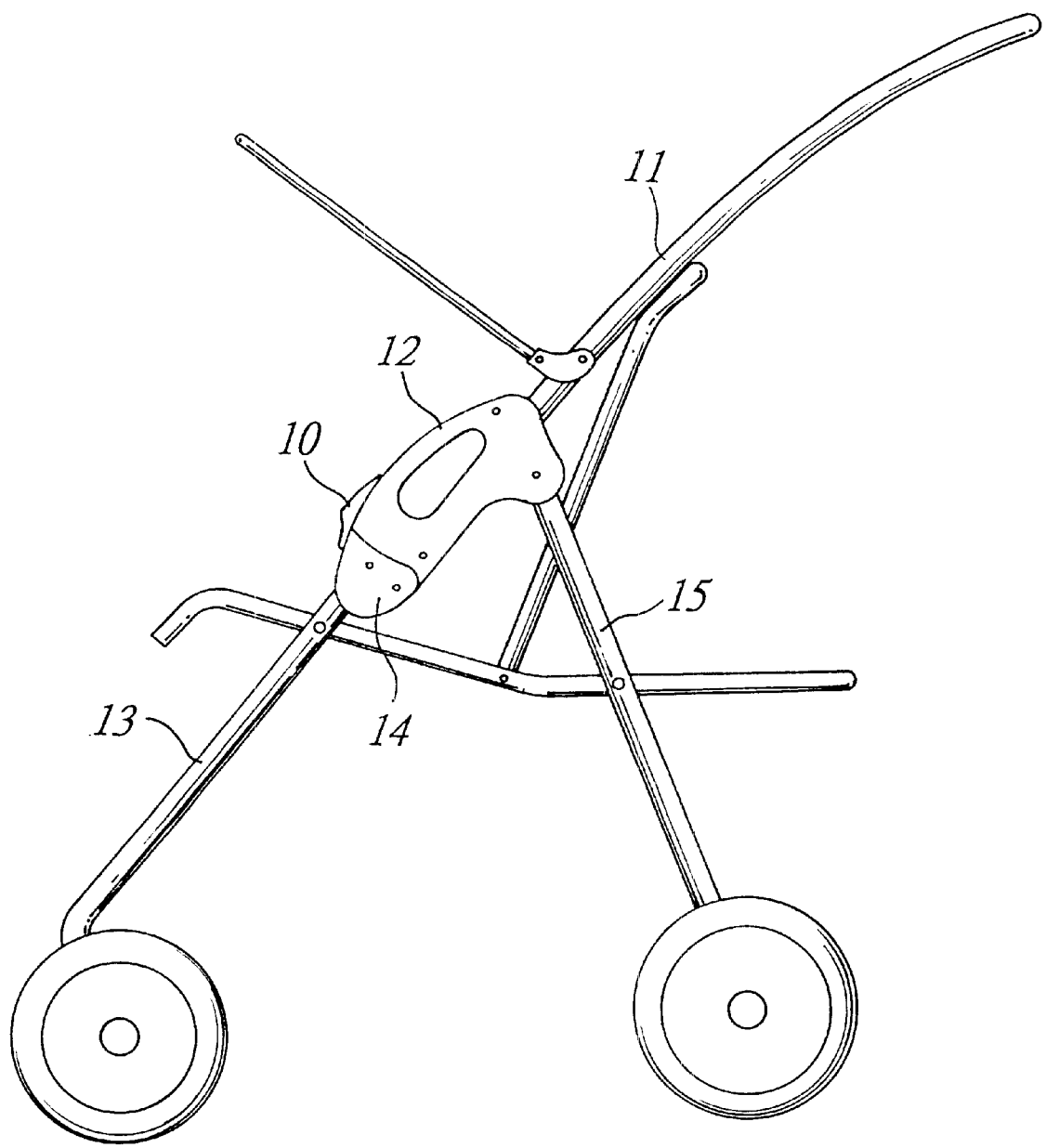
FIG. 2 is a view showing a foldable stroller using the folding device according to the resent invention.

FIG. 2 is a view showing a foldable stroller using the folding device according to the present invention. As seen from FIG. 2, the folding device of the present invention is used for securely fixing the upper supporting member (11), the lower supporting member (13) and the rear supporting member (15) of a stroller to form a supporting structure when the stroller is stretched in an extended position.

Figure 3:
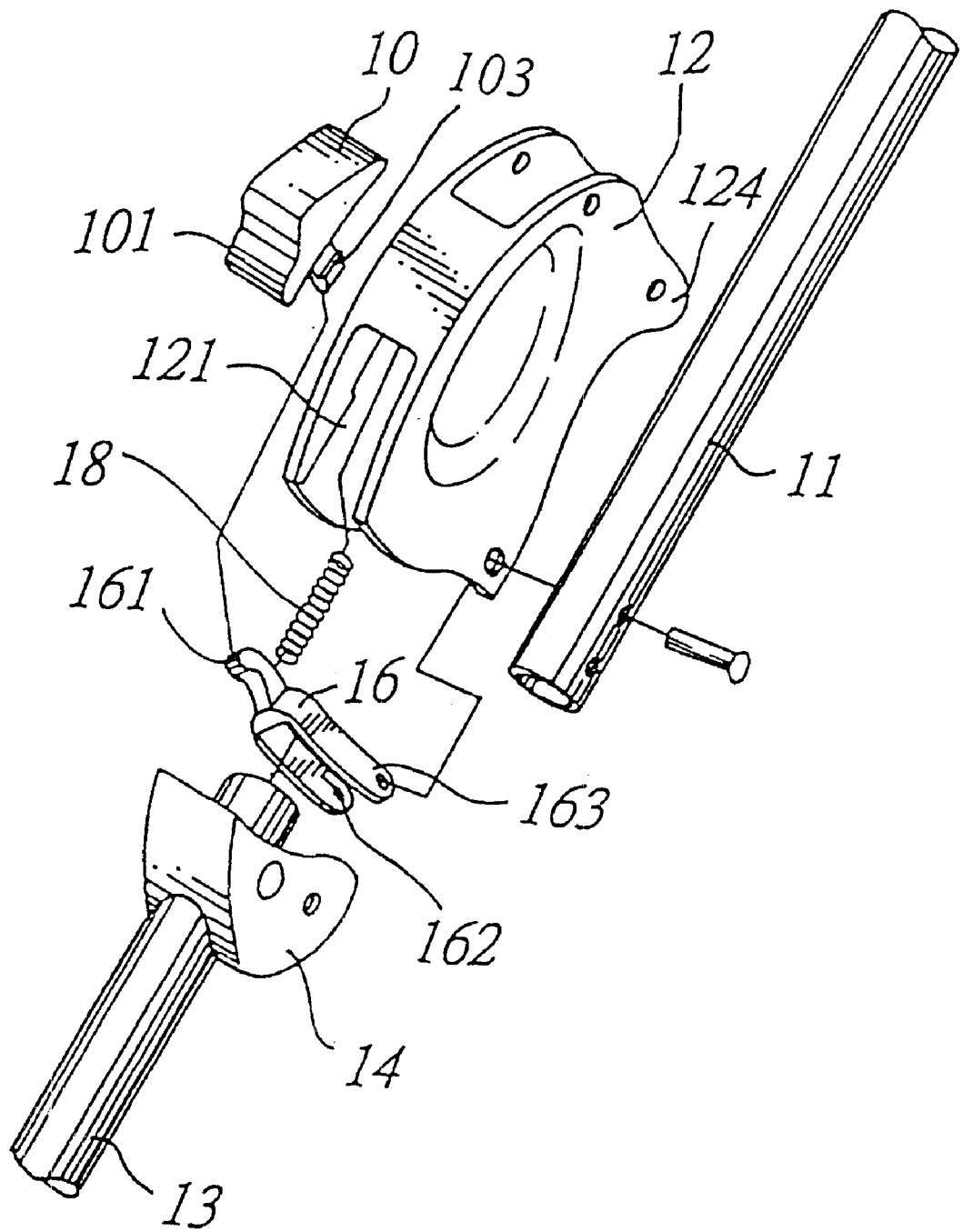
FIG. 3 is an exploded view showing the folding device according to the present invention.

Referring to FIG. 3 which is an exploded view showing the folding device according to the present invention, the folding device primarily comprises a switch button (10), a handle portion (12), a linkage portion (14), an engaging means (16) and a spring (18). The linkage portion (14) has a hole (141) through which the lower supporting member (13) passes. The lower supporting member (13) is firmly fixed on the linkage portion (14) by rivets. On one hand, the upper supporting member (11) is pivotally mounted on the linkage portion (14) by rivets. The handle portion (12) has an opening (121) through which the protrusion portion (161) of the engaging means (16) passes, a hole (122) for accommodating and fixing the upper supporting member (11) of the stroller, two lugs (123, 124) for fixing the rear supporting member (15) of the stroller, and a spring receiving portion (125). The upper supporting member (11) passes through the hole (122) and is firmly fixed on the handle portion (12) together with two fixing arms (162, 163) of the engaging means (16) by rivets. The rear supporting member (15) is pivotally fixed on two lugs (123, 124) of the handle portion

(12) by rivets. The engaging means (16) has a protrusion portion (161) which is accommodated and secured in the recess (102) of the switch button (10), two fixing arms (162, 163) which are fixed on the handle portion (12) together with the upper supporting member (11) by rivets, and a recess (164) for holding the spring (18). The spring (18) is mounted between the protrusion (161) of the engaging means (16) and the spring receiving portion (125) of the handle portion (12), for biasing the protrusion (161) of the engaging means (16) forwards so that the engaging means (16) would be engaged with the lower supporting member (13). The switch button (10) has a depressing portion (101) on the top and a recess (102) at the bottom for accommodating the protrusion (161) of the engaging means (16).

In the design of the present invention, when the stroller is stretched in an extended position, the lower supporting member (13) is engaged with the engaging means (16) which is fixed on the upper supporting member (11). In other words, the lower supporting member (13) is firmly fixed with respect to the upper supporting member (11) by the engaging means (16). Therefore, the whole supporting structure for a stroller is very firm and secure.

Figure 4A:
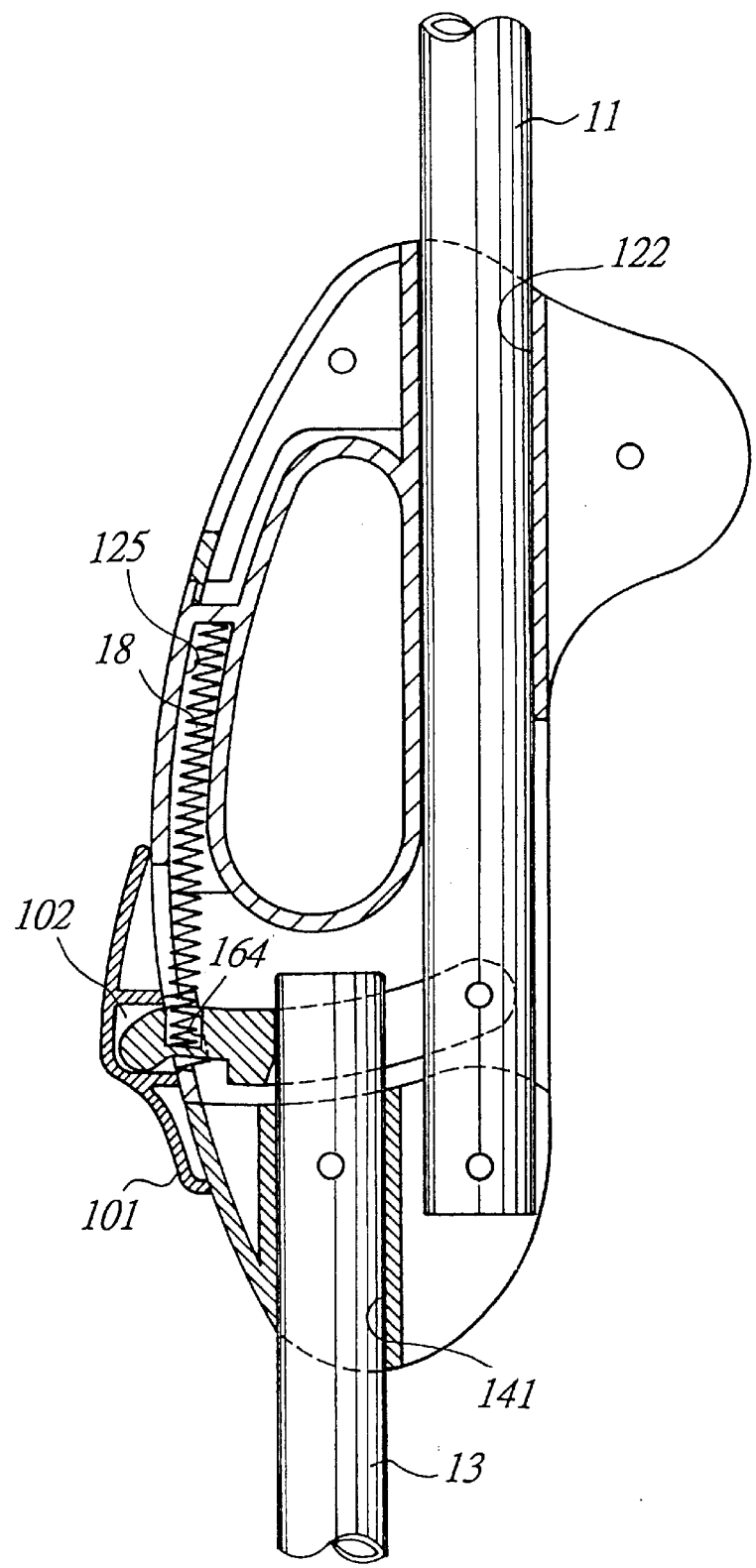
FIG. 4A is a view showing the status of the folding device according to the present invention when the foldable stroller is stretched in an extended position.
Figure 4B:
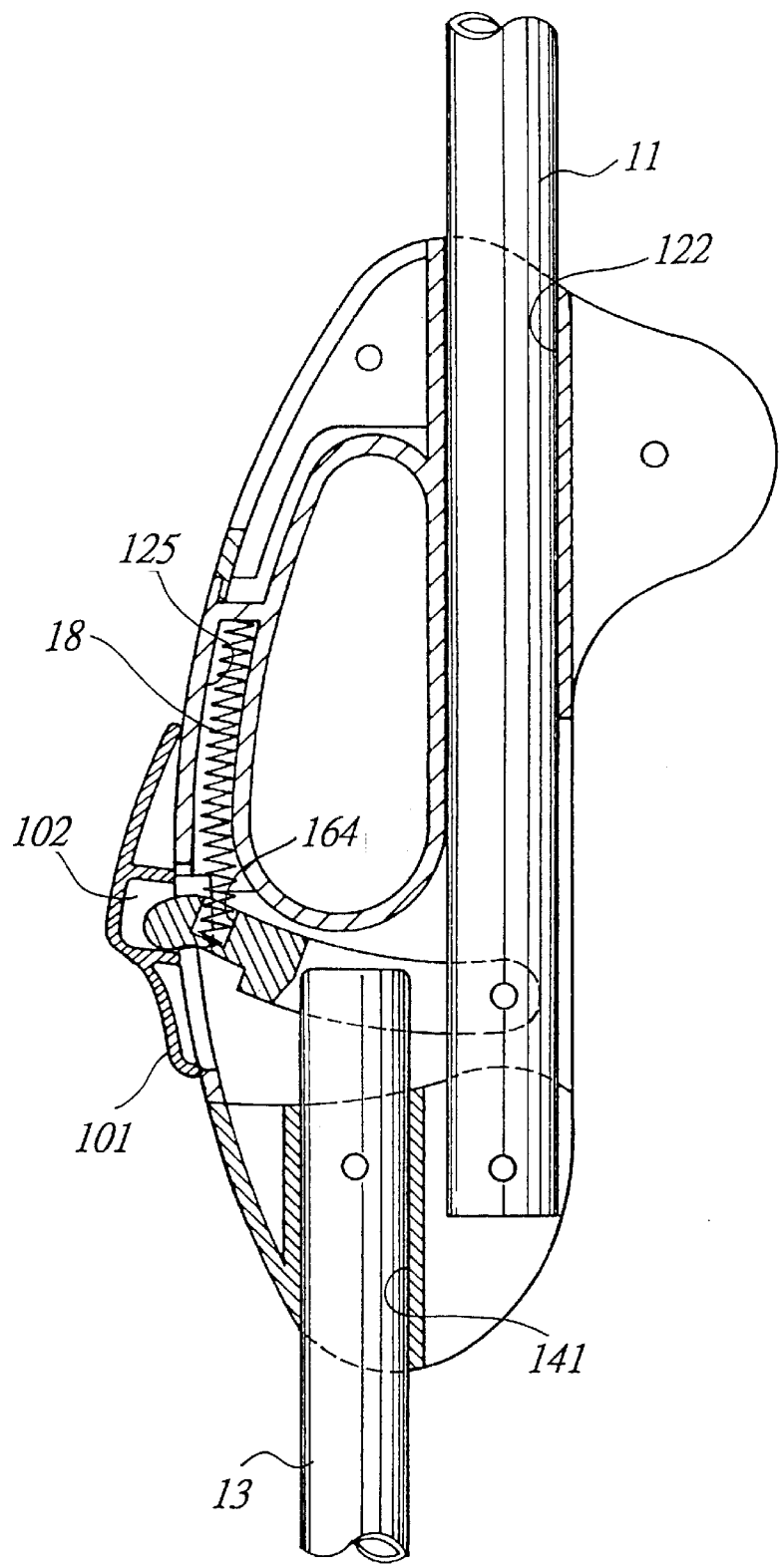
FIG. 4B is a view showing the status of the folding device according to the present invention when the switch button is pulled backwards to release from the engaged status of the folding device.
Figure 4C:
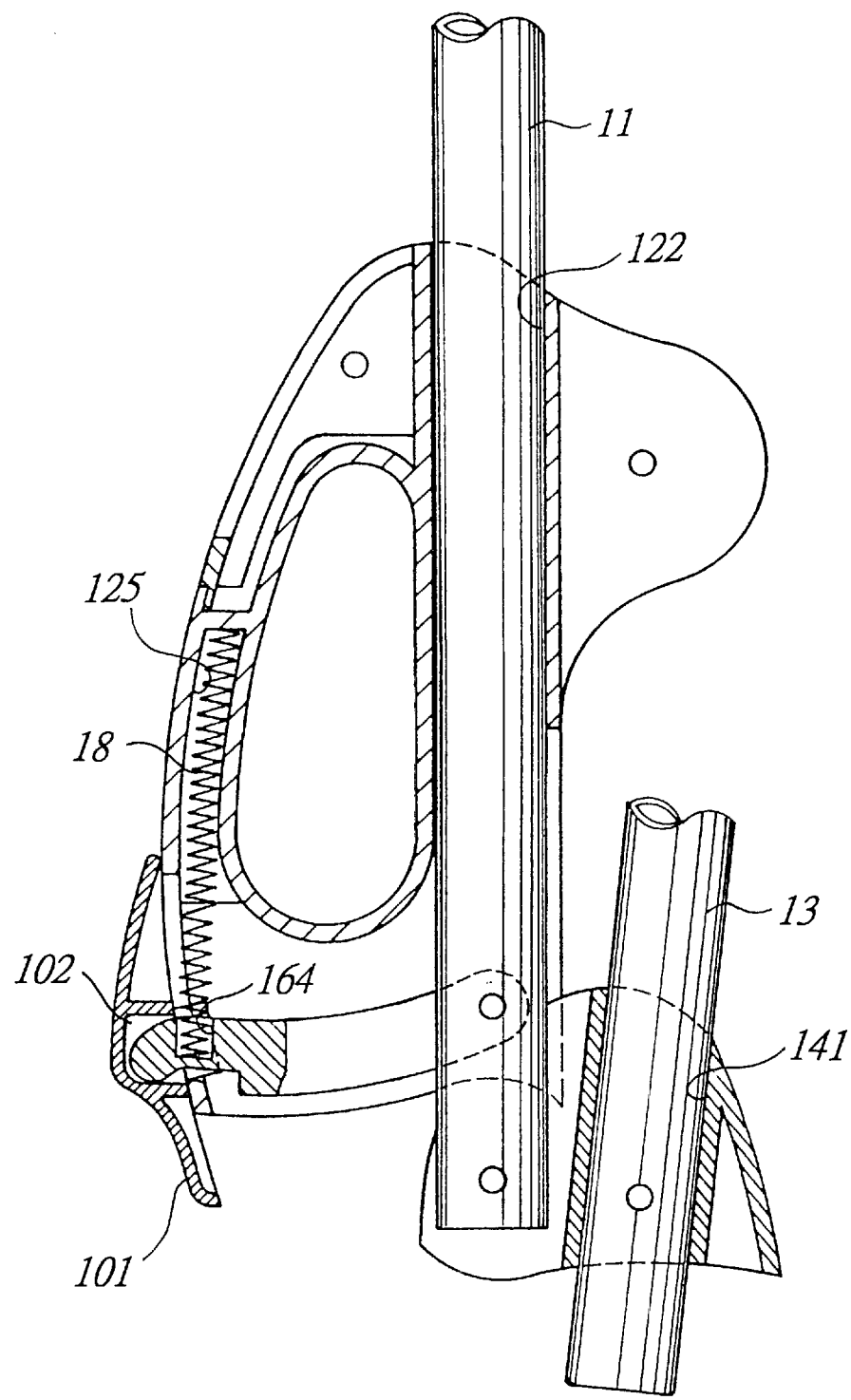
FIG. 4C is a view showing the status of the folding device according to the present invention when the foldable stroller is collapsed for carriage or storage.

Referring now to FIGS. 4A–4C, operation of the folding device according to the present invention will be described in detail FIG. 4A depicts the folding device according to the present invention when the foldable stroller is placed in an extended position. As shown in FIG. 4A, the engaging means (16) is biased forwards by the spring (18) so that the lower supporting member (13) is firmly fixed with respect to the upper supporting member (11) and a secure supporting structure is formed, To release the engaged state between the lower supporting member (13) and the upper supporting member (11), a user may put, for example, his thumb on the depressing portion (101) of the switch button (10) and pull the switch button (10) backwards. FIG. 4B depicts the folding device according to the present invention when the switch button (10) is pulled backwards In FIG. 4B, the switch button (10) brings the engaging means (16) backwards so that the lower supporting member (13) can be disengaged with the upper supporting member (11). After the lower supporting member (13) is disengaged from the upper supporting member (11), the user may pivot the upper supporting member (11) with respect to the linkage portion (14) to put the stroller in a collapsed state, as shown in FIG. 4C. To facilitate the smooth movement of the switch button (10) with respect to the handle portion (12), there are provided two protrusions (103) located at both (sides of the switch button (10) respectively.

As described above, in the present invention, the lower supporting member (13) is firmly fixed with respect to the upper supporting member (11) by the engaging means (16). Therefore, the supporting structure for the stroller is very firm and secure. In the design of the present invention, the inadvertent disengagement between the lower supporting member (13) and the upper supporting member (11) can be effectively avoided. In addition, the present invention has many merits, for example, the folding device can endure a long period usage and the assembly thereof is very easy.

While one embodiment of the present invention has been described using specific terms, such description is for illustrative purposes only, and it should be understood that changes and variations may be made without departing from the spirit of scope of the following claims.

Numeral Reference:

10 switch button
11 upper supporting member
12 handle portion
13 lower supporting member
14 linkage portion
15 rear supporting member
16 engaging means
18 spring
101 depressing portion
102 recess
103 guide rail
104 guide rail
121 opening
122 hole
123 lug
124 lug
125 spring receiving portion
141 hole
161 protrusion portion
162 fixing arm
163 fixing arm
164 recess

What is claimed is:

1. A folding device for a stroller, comprising;
    a handle portion defining a spring-receiving region;
    a switch button, having a bottom portion that defines a recess, operatively affixed to said handle portion;
    a linkage portion that is attachable to a lower support member of the stroller;
    an engaging means including a protruding portion that protrudes to matingly engage within said recess in said switch button, said engaging means defining a recess sized to receive a spring;
    a spring, disposed at least partially within said recess in said engaging means, said spring having a first spring end attachable to said protruding portion of said engaging means, and having a second spring end secured by said spring-receiving region of said handle portion;
    wherein said spring biases said protruding portion forward such that said engaging means engages with a lower supporting member of the stroller.

2. The folding device of claim 1, wherein said switch button includes at least one guide protrusion disposed to cooperate with said handle portion;
    wherein smooth sliding movement of said switch button relative to said handle portion is facilitated.

3. The folding device of claim 1, wherein said handle portion defines a recess sized to receive a region of said rear support member of said stroller.

4. A folding device for a stroller, comprising:
    a handle portion;
    a switch button, having a bottom portion that defines a recess, operatively affixed to said handle portion;
    a linkage portion attachable to a lower support member of the stroller;
    an engaging means including a protruding portion that protrudes to matingly engage within said recess in said switch button, said engaging means defining a recess sized to receive a means for biasing;
    means for biasing, disposed at least in part within said recess defined in said engaging means, to bias said protruding portion of said engaging means away from a region of said handle portion;
    wherein said means for biasing biases said protruding portion forward such that said engaging means engages with a lower supporting member of the stroller.

5. The folding device of claim 4, wherein:
    said means for biasing includes a spring, disposed at least partially within said recess in said engaging means, said spring having a first spring end attachable to said protruding portion of said engaging means, and having a second spring end secured by said spring-receiving region of said handle portion.

6. The folding device of claim 4, wherein said switch button includes at least one guide protrusion disposed to cooperate with said handle portion; wherein smooth sliding movement of said switch button relative to said handle portion is facilitated.

7. The folding device of claim 4, wherein said handle portion defines a recess sized to receive a region of said rear support member of said stroller.

* * * * *